ved. The present invention provides a memory organization scheme for a high-performance memory controller. The
United States Patent [19]

Fung et al.

[11] Patent Number: 4,924,375

[45] Date of Patent: May 8, 1990

[54] PAGE INTERLEAVED MEMORY ACCESS

[75] Inventors: Michael G. Fung, San Jose; Justin Wang, Saratoga, both of Calif.

[73] Assignee: Chips and Technologies, Inc., San Jose, Calif.

[21] Appl. No.: 112,863

[22] Filed: Oct. 23, 1987

[51] Int. Cl.$^5$ .............................................. G06F 1/00
[52] U.S. Cl. ................................ 364/200; 364/243.6; 364/243; 364/246.1; 364/246.4
[58] Field of Search .................. 364/200 MS, 900 MS

[56] References Cited

U.S. PATENT DOCUMENTS

| | | |
|---|---|---|
| 3,796,996 | 3/1974 | Curley et al. |
| 3,806,881 | 4/1974 | Miwa et al. |
| 4,280,176 | 7/1981 | Tan ........................................ 364/200 |
| 4,293,910 | 10/1981 | Flusche et al. ........................ 364/200 |
| 4,500,961 | 2/1985 | Engles .................................... 364/200 |
| 4,513,374 | 4/1985 | Hooks, Jr. .............................. 364/200 |
| 4,546,451 | 10/1985 | Bruce ...................................... 364/900 |
| 4,685,084 | 8/1987 | Canepa .................................. 365/189 |
| 4,701,843 | 10/1987 | Cohen .................................... 364/200 |
| 4,740,911 | 4/1988 | Shar et al. .............................. 364/900 |
| 4,752,915 | 6/1988 | Suzuki et al. |
| 4,780,855 | 10/1988 | Iida et al. |
| 4,888,773 | 12/1989 | Arlington et al. .................... 364/900 |

OTHER PUBLICATIONS

Chips and Technologies Introduces First 385-CHIP-Set-Sets New Standard for Microcomputer Price/Performance (Press Rel.).
"Computer Storage Systems & Technology", John Wiley & Sons, 1977, A Wiley-Interscience Publication, pp. 339-341.
"Computer Organization & the System/370", Harry Katzan, Jr., Computer Science Series, pp. 287-292.
Intel, 2104A 4K RAM Data Sheet, 1977, pp. 3-7.
Intel, iAPX 286 Hardware Reference Manual, 1983, pp. 4-11.

Primary Examiner—Gareth D. Shaw
Assistant Examiner—Rebecca L. Rudolph
Attorney, Agent, or Firm—Townsend and Townsend

[57] ABSTRACT

The present invention provides a memory organization scheme for a high-performance memory controller. The memory organization of the present invention combines page mode techniques and interleaving techniques to achieve high-performance.

Sequential pages of memory are interleaved between memory banks so that memory accesses which are a page apart will be to two different memory banks. A page is preferably defined by a single row, with 2K columns per row defining the number of bits in a page. Accesses to bits in the same page as a previous access omit the row pre-charge cycle, thus speeding up the memory cycle. Accesses to a separate bank of memory chips from the previous access are likewise speeded up since there is no need to wait for the completion of the cycle in the previous bank before initiating the cycle in the separate bank.

1 Claim, 4 Drawing Sheets

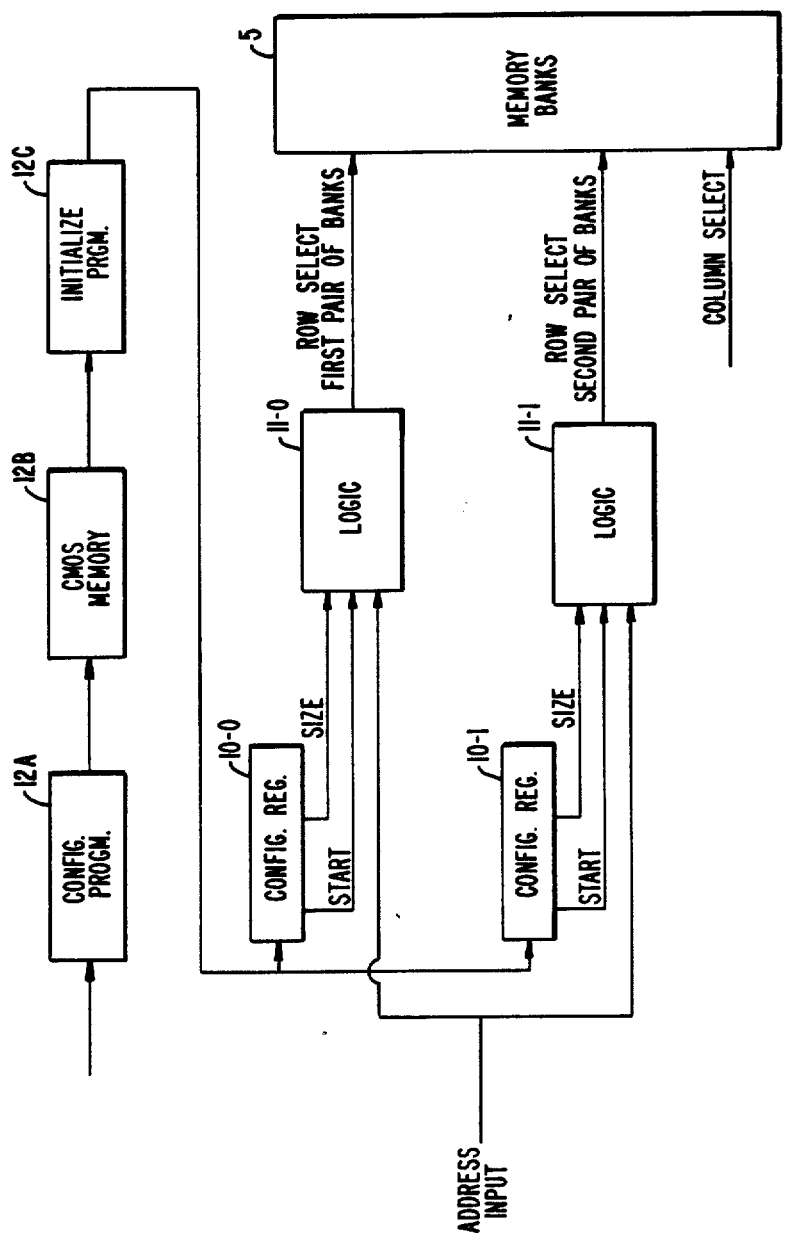
FIG._1.

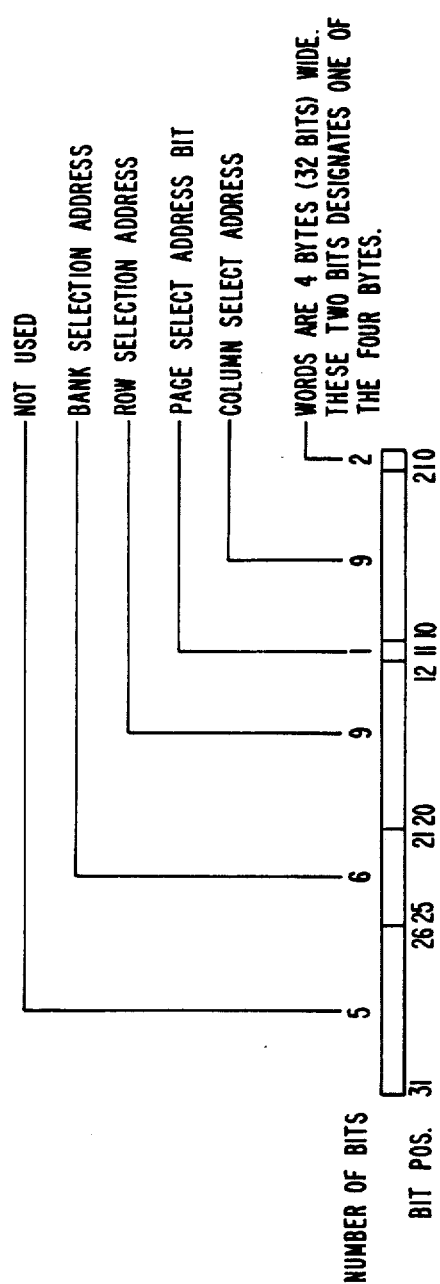
FIG._2.

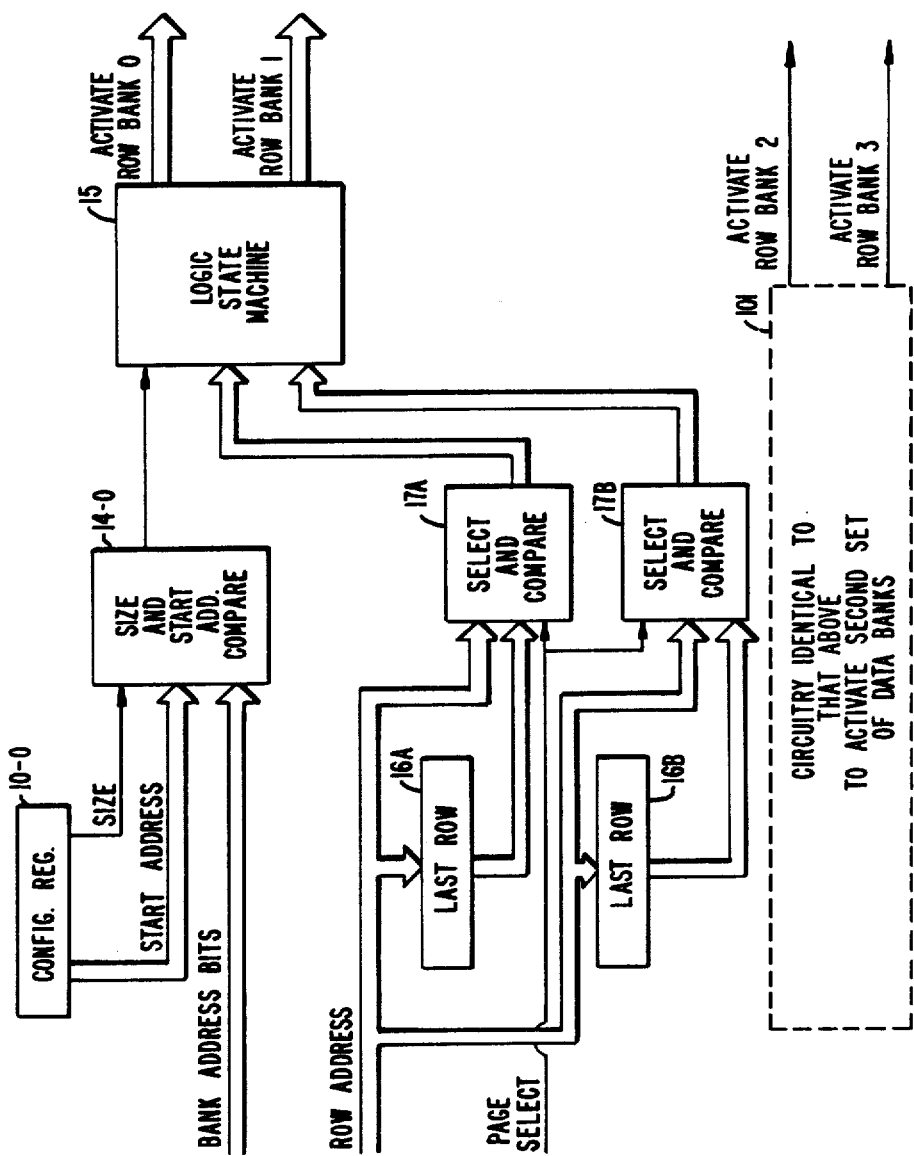
FIG._3.

256K DRAMS

ONE BANK OF DRAMS
PAGE NUMBER

```
┌─────┐
│  0  │
│  1  │
│  2  │
│  ⋮  │
│ 510 │
│ 511 │
└─────┘
```

TWO BANKS OF DRAMS

```
┌──────┐  ┌──────┐
│  0   │  │  1   │
│  2   │  │  3   │
│  4   │  │  5   │
│  ⋮   │  │  ⋮   │
│ 1020 │  │ 1021 │
│ 1022 │  │ 1023 │
└──────┘  └──────┘
```

FOUR BANKS OF DRAMS

```
┌──────┐ ┌──────┐ ┌──────┐ ┌──────┐
│  0   │ │  1   │ │ 1024 │ │ 1025 │
│  2   │ │  3   │ │ 1026 │ │ 1027 │
│  4   │ │  5   │ │ 1028 │ │ 1029 │
│  ⋮   │ │  ⋮   │ │  ⋮   │ │  ⋮   │
│ 1020 │ │ 1021 │ │ 2044 │ │ 2045 │
│ 1022 │ │ 1023 │ │ 2046 │ │ 2047 │
└──────┘ └──────┘ └──────┘ └──────┘
```

1 MEG DRAMS

ONE BANK OF DRAMS

```
┌──────┐
│  0   │
│  1   │
│  2   │
│  ⋮   │
│ 2046 │
│ 2047 │
└──────┘
```

TWO BANKS OF DRAMS

```
┌──────┐  ┌──────┐
│  0   │  │  1   │
│  2   │  │  3   │
│  3   │  │  5   │
│  ⋮   │  │  ⋮   │
│ 4094 │  │ 4095 │
│ 4096 │  │ 4097 │
└──────┘  └──────┘
```

FOUR BANKS OF DRAMS

PAGE INTERLEAVED MEMORY ACCESS

TECHNICAL FIELD

The present invention relates to digital computers and, more particularly, to a memory accessing system for digital computers.

BACKGROUND AND PRIOR ART

Memories in digital computers generally include a plurality of dynamic random access memory (DRAM) chips. Conventional DRAMS are generally arranged in a square array. For example, a conventional 256K DRAM has 512 rows and 512 columns, and a conventional 1 megabit DRAM has 1,024 rows and 1,024 columns.

DRAMS have row select lines and column select lines. A DRAM is operated by first selecting a row and next selecting a column. The amount of time required to select a column is considerably less than the amount of time required to select a row. It is possible to execute a relatively slow row select operation and to then quickly select a number of columns from that row. The type of operation wherein a slow row select is followed by several fast column selects is generally referred to as a page mode operation of a DRAM. In page mode, one can select words within a page much faster than one can select words which are on different pages.

Another characteristic of conventional DRAMS is that prior to the selection of a row, the row select line must be pre-charged. If one seeks to read sequential locations which are on different rows, after the first read cycle, one must wait for the pre-charge portion of the cycle to be completed before one can execute another read operation. In order to avoid this problem, one can use a known technique termed interleaved memory. In a conventional interleaved memory, there is an "even" memory bank and an "odd" memory bank. Any two sequential memory locations are stored in different memory banks. If one reads two sequential memory locations, the operation is as follows: the first location is read in the first memory bank and while that bank is being precharged, the second location is read from the second memory bank. Thus, since two sequential locations will be in different banks, they can be read very quickly without waiting for an intervening pre-charge cycle.

The interleaved memory technique is based on the premise that there is a reasonably high probability that sequential accesses to memory will be in successive memory locations. Thus, sequential memory locations are placed in different banks so that they can be accessed quickly.

OBJECTS OF THE INVENTION

The present invention provides a memory organization which, on a statistical basis, will be able to more quickly access memory locations.

Yet another object of the present invention is to provide a memory accessing mechanism for a digital computer which takes into account the probability of how memory locations are in fact generally accessed.

A still further object of the present invention is to provide a memory accessing scheme which has a high probability of avoiding the necessity of delaying memory access due to the need to wait through a pre-charge cycle.

Another object of the present invention is to take advantage of the fact that in a digital computer environment, generally successive memory accesses are either to directly adjacent memory locations or they involve locations that are more than 2K away from the location then being accessed.

A further object of the present invention is to provide a memory organization which takes advantage of the fact that memory access generally follows a pattern where instructions are sequentially stored in one section of memory and data is separately stored in another section of memory. Memory access requests generally switch between instructions and data. The instructions and the data sections of memory are widely separated, but considering a series of memory accesses, all the instructions requests are to contiguous sections of memory and all data requests are to a different contiguous sections of memory.

SUMMARY OF THE INVENTION

The present invention provides a memory organization scheme for a high-performance memory controller. The memory organization of the present invention combines page mode techniques and interleaving techniques to achieve high-performance.

The page interleaving of the present invention takes advantage of the statistical fact that in the usual computer environment, sequential memory accesses call for a mixture of instructions and data. However, considering a series of memory access requests, the instructions requested are normally to contiguous memory locations and the data requested are to contiguous memory locations which are at least more than 2K away from the instruction locations. While directly sequential memory locations are accessed, the system of the present invention takes advantage of the page accessing capability of DRAM memories. Where accessing is more than 2K away, the present invention takes advantage of an interleave scheme. Thus, the present invention combines the advantages of page memory organization and interleaved memory organization.

The present invention provides a high-performance memory controller for a memory that is divided into banks said memory being arranged in a plurality of rows and in a plurality of columns, each row and column being individually addressed, each row requiring a pre-charge cycle prior to being accessed, comprising in combination:

a memory addressing bus that has at least one page indicating bit which indicates if a particular address is on an odd or an even page of said memory, said odd and even pages being in different ones of said banks, each page being one of said rows of memory;

means, coupled to said memory addressing bus, for switching between rows of said memory, in response to the value of said page addressing bit, by enabling an appropriate one of said banks;

means, coupled to said memory addressing bus, for registering the last row that was accessed in each bank of said memory from the row address bits of a last memory address;

means for comparing the row address of a current address to said row address in said means for registering and providing a row pre-charge cycle to a bank of said memory enabled by said switching means only when said current and last row address are different; and whereby sequential memory accesses to the same row in said memory are started without waiting for a row pre-charge cycle to be completed.

DESCRIPTION OF THE DRAWINGS

FIG. 1 shows an simplified overall diagram of the system.

FIG. 2 shows the layout of an instruction word.

FIG. 3 shows is a logical circuit which operates in accordance with the present invention.

FIG. 4 shows how memory pages are organized.

DETAILED DESCRIPTION OF THE PREFERRED EMBODIMENT

The specific embodiment of the invention described herein is a memory accessing system for a digital computer which has a 36 bit data bus (32 data bits and 4 parity bits). A byte of data is eight bits of data; hence, a 36 bit data bus can accommodate 4 bytes of data and 4 parity bits, (only the 32 data bits will be discussed in the description that follows). Personal computers having this type of memory bus system are commercially available.

FIG. 1 shows a memory system 5 which has a plurality of memory banks. Memory 5 is designed to accommodate either 256K DRAMS or 1 meg DRAMS. The memory 5 can have one, two or four banks of DRAMS. Each bank can have either:

(a) Thirty-six 256K DRAMS, that is, one megabyte of memory. Note: 4 bytes (32 bits) times 256K equals 1 megabyte.

(b) Thirty-six 1 meg DRAMS, that is, four megabytes of memory. Note: 4 bytes (32 bits) times 1 meg equals 4 megabytes.

If there is only one bank of memory, the starting address of the bank is always zero. Furthermore, if there is only one bank of memory, the system can easily detect the amount of memory installed by trying to write and read in the higher addresses, hence, the problems associated with multiple of memory does not arise. Likewise it is not possible to have even and odd pages in different banks if there is only one memory bank.

The specific embodiment of the invention described herein can accommodate either, one, two or four banks of memory. Where there is more than one bank of memory, the banks of memory are arranged in pairs so that there is either one or two pairs of banks. Both banks in any pair must have either 256K DRAMS or 1 meg DRAMS. However, any pair of banks can have either 256K DRAMS or 1 meg DRAMS. The various possible combinations of DRAMS are given below. The allowable combinations of 256K and 1 Meg DRAMs in memory 5 are:

|  | PAIR ONE | | PAIR TWO | | TOTAL |
|---|---|---|---|---|---|
|  | BANK 1 | BANK 2 | BANK 3 | BANK 4 | Memory |
| Chip size | 256K | | | | 1 Meg |
| start address | 0 | | | | |
| Chip size | 1 Meg | | | | 4 Meg |
| start address | 0 | | | | |
| Chip size | 256K | 256K | | | 2 Meg |
| start address | 0 | | | | |
| Chip size | | | 256K | 256K | 2 Meg |
| start address | | | 0 | | |
| Chip size | 256K | 256K | 256K | 256K | 4 Meg |
| start address | 0 | | 2 Meg | | |
| Chip size | 1 Meg | 1 Meg | | | 8 Meg |
| start address | 0 | | | | |
| Chip size | | | 1 Meg | 1 Meg | 8 Meg |
| start address | | | 0 | | |
| Chip size | 256K | 256K | 1 Meg | 1 Meg | 10 Meg |
| start address | 8 Meg | | 0 | | |
| Chip size | 1 Meg | 1 Meg | 256K | 256K | 10 Meg |
| start address | 0 | | 8 Meg | | |
| Chip size | 1 Meg | 1 Meg | 1 Meg | 1 Meg | 16 Meg |
| start address | 0 | | 8 Meg | | |

Each pair of memory banks has a byte (eight bits) of associated configuration data. This byte of data indicates what type of DRAMS have been inserted into the particular pair of memory banks and the staring address of that memory.

Bits 6 and 7 of the data byte associated with each pair of memory banks indicate what type of DRAMS have been inserted into that set of memory banks. These bits are set as follows: (Note, two bits give four possible combinations.)

0 no memory, bank disabled 1 256K DRAMS (2 banks of one megabyte for a total of two megabytes)

2 1 Meg DRAMS (2 banks of four megabytes for a total of eight megabytes)

3 not used

Bits 0 to 5 of the data byte associated with each pair of memory banks indicate the starting address of that set of DRAMS as follows:

| Starting Address | Use Address bits |
|---|---|
| 0 | 20 to 25 |
| 2 Megs | 21 to 25 |
| 8 Megs | 23 to 25 |

Memory 5 is divided into into pages, each of which are 2K bytes. It is noted that if thirty six 256K by 1 DRAMS are used to implement a bank, a page comprises 512 times 4 bytes, which equals 2K bytes. The possible ways that pages can be organized in memory 5 is shown in FIG. 4. It should be noted that whenever there is more than one memory bank, odd and even pages are located in different memory banks. Switching between pages is controlled by the Page Select Address Bit. The Page Select Address Bit is bit 11 in each data address word as shown in FIG. 2.

A simplified version of the circuitry which operates in accordance with this invention is shown in FIG. 1. A more complete explanation will be given later with respect to the circuitry shown in FIGS. 2 and 3. However, in order to facilitate an explanation of the invention, it will first be described with reference to the simplified flow diagram in FIG. 1.

As shown in FIG. 1, the embodiment of the invention shown herein includes a non-volatile section of memory 12B wherein system configuration data can be stored. Such memory is generally CMOS technology which can continue to store information even after the computer's main power supply has been turned off. CMOS memory uses little power and it can be operated by a relatively small battery. Computers such as the IBM AT (TM) computer include such a section of memory.

Memory 12B is initially located by a configuration program 12A that asks the operator to enter data indicating what memory chips have been inserted into the particular computer. The configuration program 12A stores this data in the non-volatile section of memory. Thereafter each time the system is powered up, an initialization program 12C reads the data from the nonvolatile memory 12B and stores it in the configuration registers 10-0 and 10-1.

As shown in FIG. 1 configuration register 10-0 is associated with the first pair of memory banks and configuration register 10-1 is associated with the second pair of memory banks. The data in register 10-0 and the input address are provided to a logic circuit 11-0, while the data in register 10-1 and the input address are provided to a logic circuit 11-1.

Control logic 11-0 and 11-1 includes logic circuitry that combines each address with the data that is stored in the associated configuration register to generate control signals for the memory. In this way, the computer never needs to know which physical location in memory is actually being addressed because the actual physical location is changed by logic.

Configuration program 12A is only run when the system is setup or initialized. Program 12A asks the operator to enter data which tells the system what size DRAMS have been inserted into the system. This data is stored in CMOS memory 12B. Thereafter each time the system is powered up, the data from CMOS memory 12B is transferred to registers 10-0 and 10.1. The general operation of the configuration program 12A and the way it obtains data and stores it in the CMOS memory 12B is conventional and it will not be explained further.

The configuration registers 10-0 and 10-1 each have two sections. The first section of registers 10-0 and 10-1 store bits 6 and 7 of the configuration byte associated with each bank of memory. As indicated above, these bits indicates what size DRAMS were installed in that memory bank.

The second section of each of the registers 10-0 and 10-1 store the starting address which will be used by that section of memory. Logic circuitry 11-0 and 11-1 combines the input address with data from the associated configuration registers 10-0 or 10-1 to generate the row selection signals for the appropriate memory bank.

The detailed manner that logic 11-0 and 11-1 operates will now be explained with reference to FIGS. 2 and 3. Each memory address comprises four bytes of data or 32 bits of data as shown in FIG. 2.

The bits in each address word are assigned as follows:

| Bits | Function |
| --- | --- |
| 0 and 1 | Designate one of the four bytes in 32 bits word |
| 2 to 10 | column select address |
| 11 | page select bit |
| 12 to 20 | row select address |
| 21 to 25 | bank select address |
| 26 to 31 | not used |

The circuitry shown in FIG. 3 operates on a page interleaved mode. In each page several columns can be accessed without waiting for a precharge cycle. Likewise, one can alternate pages and select columns from already accessed pages without waiting for a precharge cycle. This means that if, for example, a series of memory requests includes (a) a number of requests for instructions that are located in one section of memory and (b) a request for several pieces of data that are located in a second section of memory, where the two memory sections are more than 2K apart, the data and the instructions can be accessed without waiting for a precharge cycle. The possible page organizations for the memory are shown in FIG. 4. As shown in FIG. 4, even and odd pages are located on different memory banks.

Page interleave operation of a system which operates according to the principles of the present invention is explained in the publicly available literature which describes the 82C302 Page/Interleave Memory Controller Chip which is available from Chips and Technologies Incorporated, Milpitas, Calif. Such publicly available literature is hereby incorporated herein by reference. (It is noted the the above referenced circuit was not on sale more than one year prior to the filing date of this patent application.)

A more detailed description of the logical circuitry that activates the row selection circuitry in each memory bank is shown in FIG. 3. As previously explained the memory banks are divided into two pairs. The first pair includes memory banks 0 and 1. The second pair includes memory banks 2 and 3.

Each memory address activates the row selection in only one of the four memory banks. Configuration register 10-0 contains one byte of configuration data associated with the first pair of memory banks, that is, memory banks 0 and 1. The configuration data in register 10-0 gives the starting address of that bank and the size of the DRAMS in the particular bank.

Circuit 14-0 compares the bank address bits 20 to 25 to the starting address and the size indication from register 10 to determine if a particular address is in the associated pair of memory banks. If the address is the associated memory bank, a signal is provided to circuit 15.

The row address bits are supplied to registers 16A and 16B which store the row address bits of the last row that was selected in each page. Depending on the value of the page select bit in the address either circuit 17A or 17B is activated. Circuits 17A and 17B perform the following logical operation.

If the row selected is the same as the last row that was selected, that is, if the input address does match what is in register 16A or 16B, the action taken depends on the present state of the memory. If the row is already in an accessed state, then merely select the appropriate column. If the row is not in an accessed state, then first do a row select and next do a column select.

If the row selected is not the same as the last row that was selected, that is, if the input address does not match what is in register 16A or 16B, first do a row select and then do a column select.

Logical circuits 17A and 17B are conventionally designed logical circuits, the details of which are not relevant to the present invention, hence, they will not be described further.

The page select address bit in each address word, namely bit 11 as shown in FIG. 2, determines which page of memory is addressed. This bit either activates circuit 17A or 17B which which determines if the appropriate row has already been selected and then signals circuit 15. If the appropriate row has not been accessed, it is activated by circuit 15.

If circuit 14 determines that the particular address is in the associated pair of memory banks, it will send a signal to circuit 15. Circuit 15 also receives a row address and a signal from either circuit 17A or 17B which indicates if the requested row equals the last requested row. Circuit 15 is both a logic circuit and a state machine since whether or not it activates a row selection circuit depends both on the inputs it receives and whether or not the particular circuit has previously been selected. In practice circuits 14, 15, 16 and 17 can be logically combined into one logic circuit. These are herein shown as separate boxes for ease of explanation. The details of how the logic is implemented is not relevant to the present invention.

The column selection circuitry for memory 5 is not shown since it is conventional. Likewise other details of the actual memory have not been shown since they are conventional.

FIG. 3 shows a dotted box 101 which indicates that memory banks 2 and 3 have circuitry associated therewith that is identical to the circuitry shown above.

While a particular embodiment of the invention has been shown and claimed, it should be clearly understood that the invention is not limited to the specific embodiment shown herein. Many modification may be made without departing from the spirit and scope of the invention. The description of a specific embodiment is not meant to limit the scope of the invention. It is contemplated and specifically stated that the applicant's invention covers all such modifications and alternatives to the specific embodiment shown which may fall within the words and spirit of the appended claims. It is to be fully understood that all of the foregoing is intended to be merely illustrative and is not to be construed or interpreted as being restrictive or otherwise limiting of the present invention.

I claim:

1. A high-performance memory controller for a memory that is divided into banks, said memory being arranged in a plurality of rows and a plurality of columns, each row and column being individually addressed, each row requiring a pre-charge cycle prior to being accessed, comprising in combination:

a memory addressing bus that has at least one page indicating bit which indicates if a particular address is on an odd or an even page of said memory, said odd and even pages being in different ones of said banks, each page being one of said rows of memory;

means, coupled to said memory addressing bus, for switching between rows of said memory, in response to the value of said page addressing bit, by enabling an appropriate one of said banks;

means, coupled to said memory addressing bus, for registering the last row that was accessed in each bank of said memory from the row address bits of a last memory address, said row address bits being more significant than said page addressing bit;

means for comparing the row address of a current address to said row address in said means for registering and providing a row pre-charge cycle to a bank of said memory enabled by said switching means only when said current and last row address are different; and whereby sequential memory accesses to the same row in said memory are started without waiting for a row pre-charge cycle to be completed.

* * * * *